(12) United States Patent
Green et al.

(10) Patent No.: US 7,716,717 B2
(45) Date of Patent: *May 11, 2010

(54) IMPROVING SECURITY OF DATA COMMUNICATIONS NETWORKS

(76) Inventors: Stuart D. Green, 15204 English River Loop, Leander, TX (US) 78641; Scott G. Brown, 1908 B Westridge Dr., Austin, TX (US) 78704; Jonathan M. Crain, P.O. Box 1772, Kyle, TX (US) 78640; Jeffrey Van Myers, P.O. Box 130, Driftwood, TX (US) 78619; Carl A. Perry, 11701 N. Hwy 183, RR1, Florence, TX (US) 76527; Marcus L. Yax, 8904 Francia Tr., Austin, TX (US) 78748

( * ) Notice: Subject to any disclaimer, the term of this patent is extended or adjusted under 35 U.S.C. 154(b) by 0 days.

This patent is subject to a terminal disclaimer.

(21) Appl. No.: 11/593,226

(22) Filed: Nov. 6, 2006

(65) Prior Publication Data

US 2007/0136791 A1    Jun. 14, 2007

Related U.S. Application Data

(63) Continuation of application No. 09/624,923, filed on Jul. 25, 2000, now Pat. No. 7,152,240.

(51) Int. Cl.
  *G06F 21/00* (2006.01)
  *G06F 7/00* (2006.01)
  *G06F 15/16* (2006.01)
(52) U.S. Cl. .............................................. 726/1; 726/2
(58) Field of Classification Search ........................ None
  See application file for complete search history.

(56) References Cited

U.S. PATENT DOCUMENTS

| 5,606,668 | A |   | 2/1997  | Shwed             |         |
|-----------|---|---|---------|-------------------|---------|
| 5,632,011 | A | * | 5/1997  | Landfield et al.  | 709/206 |
| 5,835,726 | A | * | 11/1998 | Shwed et al.      | 709/229 |
| 5,928,333 | A |   | 7/1999  | Landfield et al.  |         |

(Continued)

OTHER PUBLICATIONS

"WatchGuard LiveSecurity™ —A New Approach to Network Security and Managed Security Services", WatchGuard Technologies, Inc., Seattle, WA (Jun. 1998).

(Continued)

*Primary Examiner*—Christopher A Revak
(74) *Attorney, Agent, or Firm*—Perkins Coie LLP

(57) ABSTRACT

A FireNet security system in which trustworthy networks, called BlackNets, each comprising One (1) or more client computers, are protected by FireBreaks against attacks from untrustworthy networks, called RedNets. All incoming transactions from the RedNet are examined by the FireBreak to determine if they violate any of a plurality of protection rules stored in a local protection rules database. Any transaction found to be in violation is discarded. Valid transactions are forwarded to the BlackNet. If an otherwise valid transaction is found to be suspicious, the FireBreak will forward to a FireNet Server relevant information relating to that transaction. If the FireNet Server verifies that the transaction is indeed part of an attack, the FireNet Server will create new protection rules suitable to defend against the newly identified source or strategy of attack. Periodically, all FireBreaks in the FireNet system will transfer, directly or indirectly, all new rules.

26 Claims, 7 Drawing Sheets

U.S. PATENT DOCUMENTS

| | | | |
|---|---|---|---|
| 5,968,176 | A | 10/1999 | Nessett et al. |
| 6,226,372 | B1 | 5/2001 | Beebe et al. |
| 6,212,558 | B1 | 6/2001 | Antur et al. |
| 6,243,815 | B1 | 6/2001 | Antur et al. |
| 6,519,703 | B1 | 2/2003 | Joyce |
| 6,574,666 | B1 | 6/2003 | Dutta et al. |
| 6,651,101 | B1 * | 11/2003 | Gai et al. .............. 709/224 |
| 6,678,822 | B1 | 1/2004 | Morar et al. |
| 6,678,827 | B1 | 1/2004 | Rothermel et al. |
| 6,708,209 | B1 * | 3/2004 | Ebata et al. .............. 709/223 |
| 6,826,694 | B1 * | 11/2004 | Dutta et al. .............. 726/13 |
| 6,990,591 | B1 | 1/2006 | Pearson |
| 7,051,365 | B1 | 5/2006 | Bellovin |
| 7,152,240 | B1 * | 12/2006 | Green et al. .............. 726/4 |
| 7,308,711 | B2 * | 12/2007 | Swander et al. .............. 726/13 |
| 7,477,640 | B2 * | 1/2009 | Oguchi et al. .............. 370/389 |
| 2001/0039576 | A1 * | 11/2001 | Kanada .............. 709/223 |

OTHER PUBLICATIONS

Sheldon, "General Firewall White Paper", Nov. 1996, Osborne McGraw-Hill, p. 1-8.

"Protecting the Internet Distributed Enterprise", Jun. 2000, Watchguard Technologies, Inc., p. 1-7.

Bellovin et al., "Network Firewalls", Sep. 1994, IEEE Communications, p. 50-57.

"All-in-one security appliances," *Network World*, vol. 16, No. 16, Apr. 19, 1999, pp. 57-60.

"Bandwidth mgmt. products get better security controls," *Network World*, vol. 16, No. 37, Sep. 1999,.

"Bay, Acend boost network security," *Computer Reseller News*, No. 688, Jun. 17, 1996, p. 67.

"Elron: Response to firewall RFP," *Network World*, Jul. 19, 1999.

"RedCreek Aims to Build Bigger VPNS: Faster Hardware and New Software Support More Users, Easier Management," *Network World*, Dec. 13, 1999, p. 17.

"Sun Microsystems Introduces Maximum Security for Internet Commercial Transactions; SunScreen Creates Virtual Secure Private Networks; FireWall-1 1.2 Completes Sun's Security Portfolio," *Business Wire*, May 1995.

"VPN RFP- Watchguard," *Network World*, May 10, 1999.

* cited by examiner

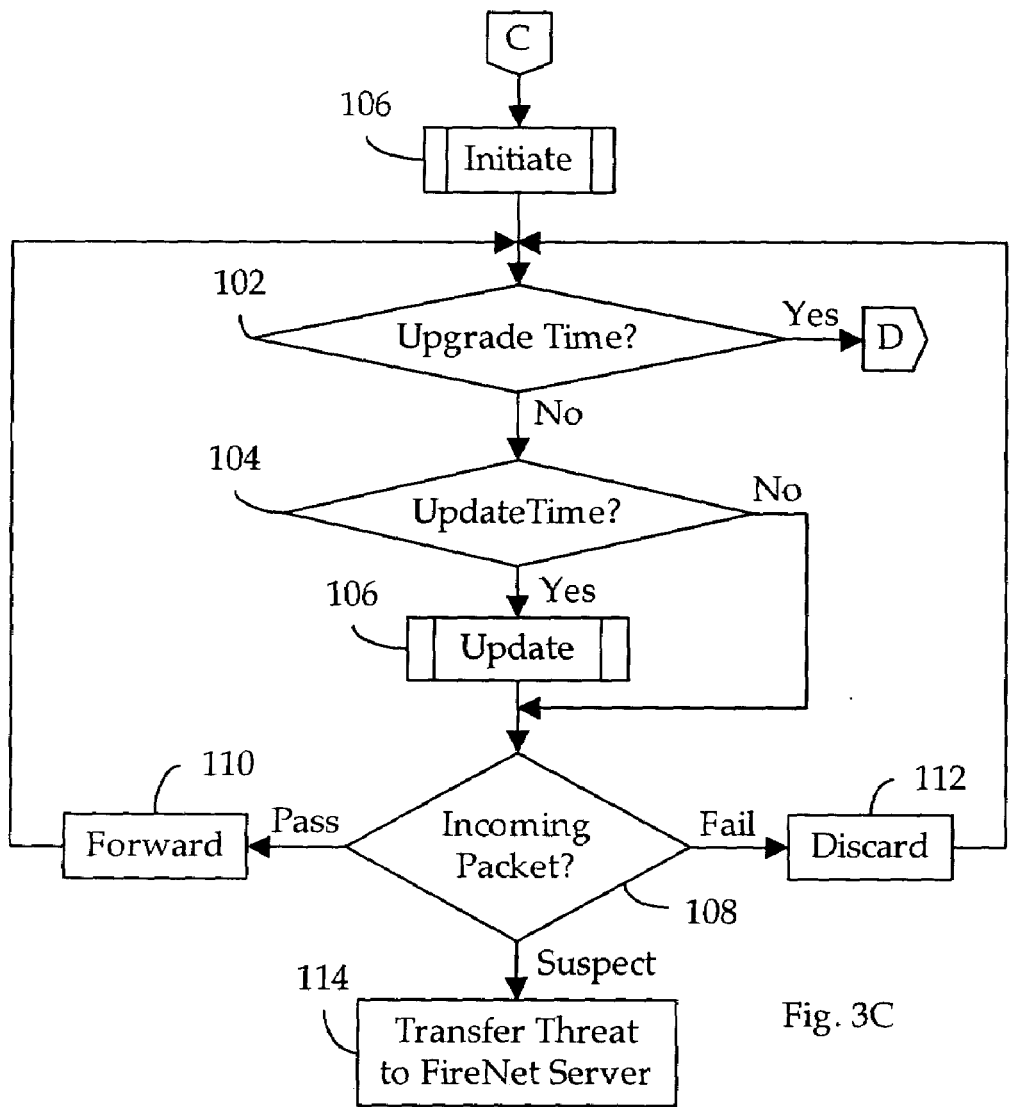
Fig. 3C
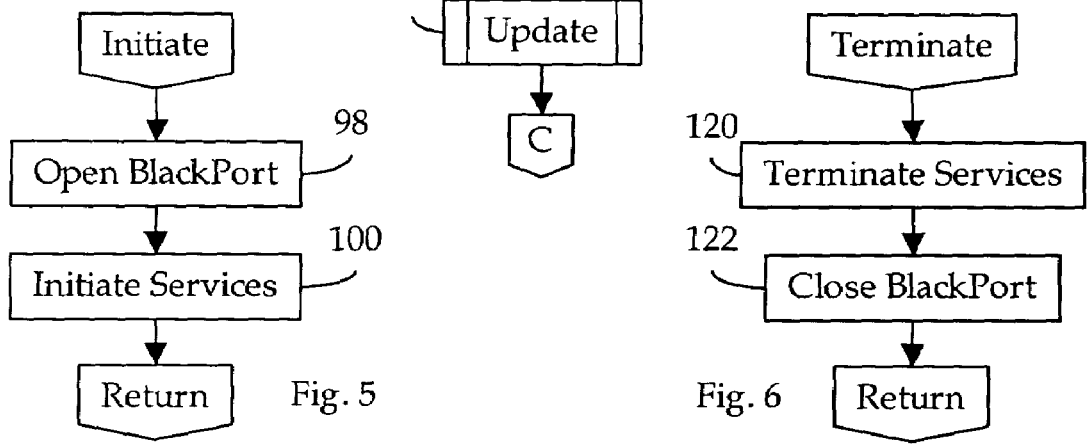
Fig. 5
Fig. 6

IMPROVING SECURITY OF DATA COMMUNICATIONS NETWORKS

CROSS REFERENCE TO RELATED APPLICATION

This patent application is a continuation Ser. No. 09/624,923, now application of U.S. Pat. No. 7,152,240, entitled "METHOD FOR COMMUNICATION SECURITY AND APPARATUS THEREFOR," filed on Jul. 25, 2000, which issued on Dec. 19, 2006. The present application is related, in part, to the following application for patent ("Related Application"):

"METHOD AND APPARATUS FOR SECURE COMMUNICATION WITH A SET TOP COMPUTING SYSTEM" by Scott G. Brown, having application Ser. No. 09/332,795, filed on 14 Jun. 1999, and assigned to the assignee hereof, now abandoned.

BACKGROUND OF THE INVENTION

1. Technical Field

The present invention relates generally to securing communications between computer systems, and, in particular, to security methods and apparatus for maintaining the security of a local client computer system from a remote server computer system.

2. Background Art

In general, in the descriptions that follow, we will italicize the first occurrence of each special term of art which should be familiar to those skilled in the art of communication system security. In addition, when we first introduce a term that we believe to be new or that we will use in a context that we believe to be new, we will bold the term and provide the definition that we intend to apply to that term. In addition, throughout this description, we may use the terms assert and negate when referring to the rendering of a signal, signal flag, status bit, or similar apparatus into its logically true or logically false state, respectively.

With the proliferation of public communication networks, more and more computers are accessible from remote locations. The worldwide public network, the Internet and its alter ego the World Wide Web, comprises many millions of computers coupled together through either low-speed Internet Service Providers ("ISPs"), or high-speed Broad-band Service Providers ("BSPs") (collectively, "SPs"). The ready availability of direct access to so many personal or business computer systems has resulted in a proliferation of criminal hackers or crackers attracted by the challenge of electronically hacking into such computing systems and either stealing commercially valuable information or just causing havoc. For convenience of reference, we shall refer to all such untrustworthy communication networks as RedNets. In contrast, we shall refer to all trustworthy local networks as BlackNets, even though, in many instants, the BlackNet may consist of a single node owned and operated by a sole individual or business client.

To date, the most effective prior art communication security mechanism, known as a firewall, interposes a trusted, autonomous device or portal between a BlackNet and a RedNet. During initial power-up, the portal generally maintains strict communication silence, and only opens the communication ports when full security has been assured. Once initialized, the portal generally forwards to the RedNet all communication transactions originated by the BlackNet. In contrast, all transactions originating in the RedNet that are addressed to the BlackNet are first examined to determine if selected characteristics of the transaction match any of a plurality of protection rules stored in a local protection rule base. If a particular transaction is found to match one of the protection rules, it is blocked and not forwarded to the Black-Net; otherwise, the transaction is forwarded to the BlackNet. An example of such a prior art communication security system is shown and described in U.S. Pat. No. 5,606,668. Although communications on many RedNets, including the Internet, are packetized, we prefer to treat each individual packet as a separate transaction, and, throughout the following description, when we use the term "transaction" we intend to include individual packets in appropriate instants.

A first type of prior art protection rule, usually called a packet filter, requires the comparison of the Internet Protocol Source Address ("IPSA") of each incoming transaction to the IPSA of a known cracker. Since it is a trivial matter for a cracker to temporarily usurp an assigned but currently inactive IPSA and so masquerade as an innocent user, this type of protection rule tends to be rather transient. Typically, it is the responsibility of the local client or, if available, the client's system administrator ("sys-admin"), to periodically update the local protection rule data base, manually, using information shared by other sys-admins on known websites. Firewalls that perform only packet filtering are sometimes referred to as network-level firewalls. In general, network-level firewalls tend to be simple and fast because they are not required to perform complex analysis of packet contents or traffic history.

A second type of prior art protection rule, called a stateful inspection, requires the examination of any of a number of distinct characteristics of the transaction, such as type, to determine if the transaction is requesting an inappropriate response from the BlackNet. Since such requests may indeed be valid in a particular situation, depending upon the specific nature of the BlackNet and its recent activity on the RedNet, such protection rules tend to be rather general in scope. As a result, in some cases, the portal must request the assistance of the local sys-admin in determining the most appropriate response. Clearly, this results in additional workload for the sys-admin, and may result in unacceptable delays in validating essential BlackNet transactions. One additional negative aspect of stateful inspection rules is that they tend to be devised as point solutions to known attack strategies. Often, by the time an appropriate protection rule set has been devised and distributed among the cooperating sys-admins, the cracker community has already devised and distributed (via notorious cracker websites) more sophisticated methodologies. Again, given that most sys-admins are already overworked, there may be significant delays in installing the newest rule sets, leaving the BlackNet vulnerable for unacceptably long periods of time. Firewalls that perform stateful inspection are sometimes referred to as stateful inspection firewalls. In general, stateful inspection firewalls tend to be more complex and slower because they are required to perform complex analysis of packet contents or traffic history.

In third type of firewall, called a proxy-level firewall, packets originated on the BlackNet are re-addressed to appear on the RedNet as if originated by the firewall portal itself. As a result of acting as a proxy for the client, the true address of that client is hidden from the RedNet. Proxy-level firewalls often perform additional useful services, such as BlackNet auditing, traffic monitoring, and time-of-day control.

In view of the interactive nature of current generation firewall portals, the implementing hardware tends to be in the form of a dedicated computer system, with associated input and output devices for the sys-admin to use in updating the protection rule data base and other support activities such as traffic analysis. While the significant cost of such systems, both initially and over time, can perhaps be amortized over a number of local nodes, that cost is certainly a significant barrier to widespread use in the home or small business environments. In fact, the requirement for a skilled sys-admin may itself make the cost of such a solution prohibitive to even moderate sized businesses.

One example of a very sophisticated, commercially available firewall system that implements most of the capabilities that we believe to be essential is the WatchGuard LiveSecurity™, available from WatchGuard Technologies, Inc., of Seattle, Oreg. However, as will be apparent from reviewing the white paper, "WatchGuard LiveSecurity™—A New Approach to Network Security and Managed Security Services", submitted herewith and incorporated herein by reference, this system is still dependent upon the timely recognition at a centralized location of new threats. Thus, until sufficient information regarding a new form of attack is finally collected, manually, at a centralized location, no response can be crafted and distributed, leaving all clients vulnerable for what may be a dangerously long time. Given the speed with which new threats can spread, such reactive systems are, we submit, simply inadequate.

In general, current commercially available firewall technology is too difficult to maintain since each portal tends to stand alone and can defend against only those attack sources or strategies of which it has been made aware. In particular, for individuals and small business owners, it is desirable to have an efficient, low maintenance security device that will automatically protect their computer systems from unauthorized accesses, and proactively report suspicious activities to a centralized threat assessment and response center. Even more important, there is an urgent need for a more convenient and, especially, timely mechanism for updating the firewall portal as to the sources and strategies of new threats.

BRIEF SUMMARY OF THE INVENTION

In a distributed, electronic firewall system which prevents transfer of selected communication transactions from an untrustworthy network to a trustworthy network: a firewall server, connected to the untrustworthy network, maintains a database of protection rules, each of which, when applied to a communication transaction, identifies that communication transaction to be a respective one of the selected communication transactions; and a plurality of firewall portals, each of which, when connected between the untrustworthy network and the trusted network, selectively transfers the database of protection rules from said server via said untrustworthy network; receives a communication transaction from the untrustworthy network for transfer to the trustworthy network; applies each of the protection rules to the received communication transaction; and prevents the transfer of the received communication transaction to the trustworthy network if a protection rule identifies the received communication transaction to be a respective one of the selected communication transactions.

In accordance with our invention, each of the protection rules may be a selected one of two classes, exclusion or guard, and the portal selectively transfers to the server at least a portion of each received communication transaction identified by a protection rule of the guard class to be a respective one of the selected communication transactions. In response, the server analyzes said portion to determine if said communication transaction represents a security threat to the trustworthy network, and, if it is so determined, constructs a new protection rule of the exclusion class and adds said new protection rule to said database. Preferably, the server analyzes such transactions using an expert system, which may allow guidance by human experts.

BRIEF DESCRIPTION OF THE SEVERAL VIEWS OF THE DRAWINGS

Our invention may be more fully understood by a description of certain preferred embodiments in conjunction with the attached drawings in which:

FIG. 5 illustrates in flow diagram form the service initiation procedure of the FireBreak OS;

FIG. 6 illustrates in flow diagram form the service termination procedure of the FireBreak OS.

Figure 1:
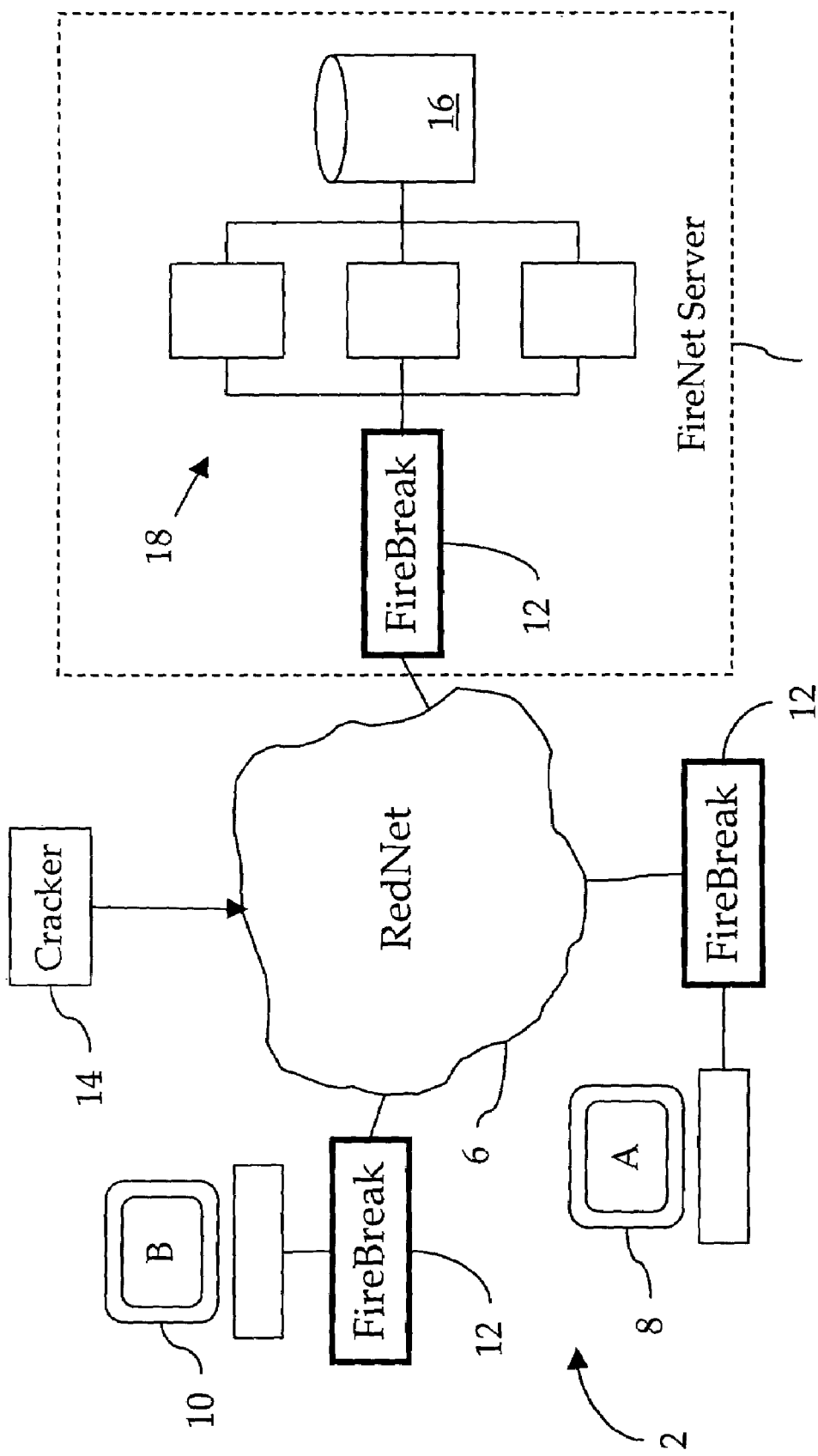
FIG. 1 illustrates in block diagram form a secure communication system, that we call a FireNet, constructed in accordance with the preferred embodiment of our invention, in which a plurality of BlackNets, each locally protected by a respective FireBreak, communicate securely over a RedNet with a remote FireNet Server.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

Our invention facilitates the construction of an electronic, distributed firewall system that we call a FireNet. In general, our FireNet is comprised of a FireNet Server that is connected via a RedNet to a plurality of remote FireBreaks, each of which protects a respective BlackNet against attacks via the RedNet. However, unlike prior art firewall systems, our FireNet Server automatically gathers information collected by, and coordinates the defensive activities of, all FireBreaks so that the entire FireNet responds very quickly to attacks made against any FireBreak in the FireNet.

During a unique initial power-up sequence, each FireBreak maintains strict communication silence, and only opens the communication ports when full security has been assured. Once initialized, the FireBreak generally allows all outgoing communication transactions to pass, although, to prevent IP spoofing, the FireBreak should discard any outgoing transaction which has an invalid IPSA. However, the FireBreak attempts to match selected characteristics of each incoming transaction against each of a plurality of protection rules stored in a local protection rule base. As in prior art firewall portals, if a match is detected, our FireBreak will discard the offending transaction.

Assume for the moment that a match is not detected, but that there is something "unexpected" about the transaction, indicating that an attack might be in progress. Unlike the prior art, our FireBreak will collect certain pertinent information regarding the transaction, such as its type and IPSA, which it promptly forwards to the FireNet Server. Then, at the option of the client, the FireBreak will either discard the transaction as being too dangerous to allow through, or pass the transaction but, perhaps, assert a warning signal, either auditory, visual or electronic.

Meanwhile, back at our FireNet Server, the information regarding the suspicious transaction will be quickly analyzed in an attempt to determine if an attack is indeed in progress, and, if so, the nature and severity of that attack. If the attack source can be identified, either directly or indirectly, or the attack strategy appears to be a variant of a known strategy, the FireNet Server will attempt to automatically construct one or more new protection rules appropriate for the new source or strategy of attack. Preferably, the FireNet Server hosts an expert system which has been trained by human experts how to devise an appropriate protection rule set. If necessary, the expert system can immediately enlist the assistance of the human experts in solving novel problems. This centralized data collection, attack analysis, and rule set generation tends to produce an optimum defense in a minimum amount of time.

All pertinent information regarding new attack sources and strategies, and any new protection rules will be added by the FireNet Server to a highly secure, FireNet database. Periodically, say every Fifteen (15) to Thirty (30) minutes, each remote FireBreak will log in to the FireNet Server, using a secure protocol, and transfer into its local protection rule base the most current set of protection rules necessary to protect the BlackNet against all known sources and strategies of attack. Thus, after only a relatively brief period of time, when another attack from the same source or using the same attack strategy is attempted against any FireBreak in the FireNet, the attack transactions will match the new protection rule and be automatically discarded.

Preferably, to reduce the update workload of the FireNet Server, the updated rules sets may be periodically transferred to all cooperating SPs, with each thereafter updating the FireBreaks of their respective subscribers. Of course, for very large FireNets, multiple FireNet Servers may be required at widely spaced locations worldwide to assure timely response to each FireBreak in the FireNet, and each such FireNet Server must be provided with secure communications with all other FireNet Servers to assure coordinated, timely worldwide defense against new attack sources and strategies.

FIG. 1 illustrates a FireNet 2 comprised of a FireNet Server 4 connected via a RedNet 6 to a BlackNet 8 and a BlackNet 10 each isolated from the RedNet 6 by a respective FireBreak 12. Of course, other users are also connected to the RedNet 6, such as the Cracker 14. The FireNet Server 4 includes a database 16, various computational units 18, and it's own FireBreak 12. The computational units 18 receive information regarding suspicious accesses from each FireBreak 12 and, perhaps with the assistance of human experts, create protection rules designed to thwart such attacks. These protection rules are then stored in the database 16. Periodically, each FireBreak 12 in the FireNet 2 logs in with the FireNet Server 4 and transfers the most recent set of protection rules so that, thereafter, that FireBreak 12 will also be able to defend its BlackNet against attacks from a particular source or using a particular attack strategy, without itself ever having been so attacked in the past. For example, if BlackNet 8 reports to the FireNet Server 4 that it is under attack by Cracker 14, the appropriate protection rules will be transferred by BlackNet 10 within a few minutes, so that BlackNet 10 can thereafter defend itself from any attack by Cracker 14 using the same IPSA or attack strategy. In this manner, every FireBreak 12 in the FireNet 2 benefits from the body of knowledge gathered by FireNet 2 as a whole.

Figure 2:
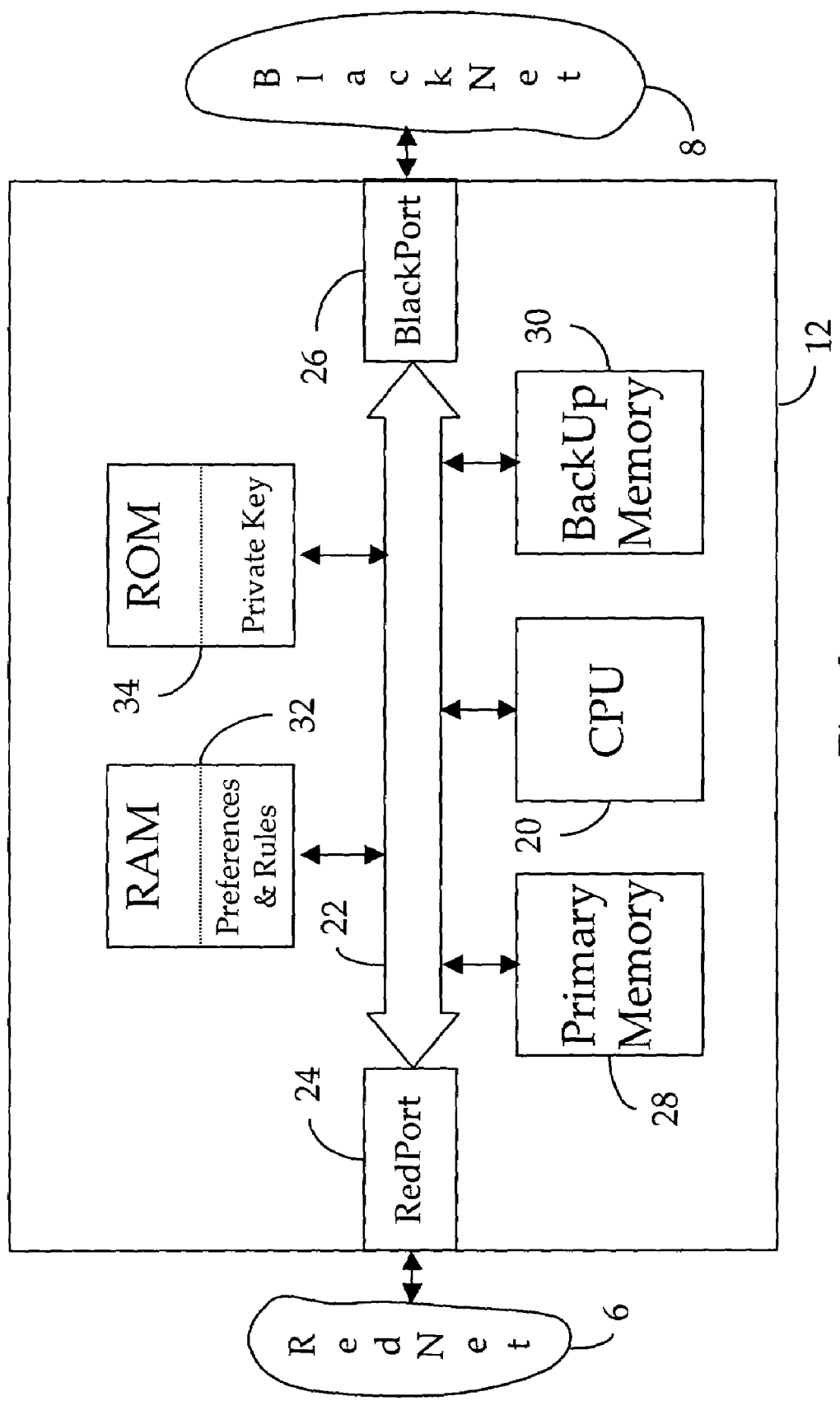
FIG. 2 illustrates in block diagram form a FireBreak according to the preferred embodiment of our invention.

As shown in FIG. 2, our FireBreak 12 includes a central processing unit or CPU 20 which is connected via bus 22 to the RedNet 6 via a RedPort 24, and to a BlackNet, say, for example, the BlackNet 8 via a BlackPort 26. Depending upon the type of communication media used in the RedNet 6, the RedPort 24 may comprise a modem interface, an Ethernet-type interface or other suitable interface circuit. Similarly, depending upon the type of communication media used in the BlackNet 8, the BlackPort 26 may be an Ethernet-type interface, or other suitable parallel or serial interface circuit.

The system memory of the FireBreak 12 is specially partitioned into a Primary Memory 28 and a BackUp Memory 30, both of which can be implemented in any of a number of conventional types of Non-Volatile Random Access Memory or NVRAM. Additional working memory is provided by a conventional RAM 32, which can be either static or dynamic, or a combination of both. Essential system software routines, such as a bootloader, and certain fixed system parameters, are stored in a Read Only Memory or ROM 34, which is preferably also of a NVRAM type.

In our preferred embodiment, we start with a hardened variant of an existing operating system ("OS"), such as the well-known "Linux", and then add our special software security modules to create a unique FireBreakOS. At the time that each FireBreak 12 is manufactured, the then-current version of this FireBreakOS is installed, first as a PrimaryOS in the Primary Memory 28, and then as a BackUpOS in the BackUp Memory 30. Contemporaneously, checksums are pre-calculated using a conventional algorithm for the object code or binaries of each of the software modules of the OS, and then stored in the ROM 34 as a Verification Dictionary. In the ROM 34 is also permanently stored a private key that is unique to that FireBreak 12. Of course, other suitable memory allocation schemes may be devised.

According to our invention, there are Two (2) classes of protection rule, Exclusion and Guard. Each Exclusion rule, when successfully applied to a transaction received from the RedNet 6, results in the automatic exclusion from transfer of that transaction to the BlackNet 8. Each Guard rule, when successfully applied to a transaction received from the RedNet 6, results, at the option of the client, in either the automatic exclusion from transfer of that transaction to the BlackNet 8 or actual transfer of that transaction to the BlackNet 8 simultaneously with an assertion of an appropriate warning signal. If desired, any rule, whether Exclusion or Guard, may be constructed so as to dynamically redirect any identified transaction to a particular node within the client, such as the computer station of the sys-admin, for local record keeping and analysis. Preferably, each rule has a predefined lifetime during which it will be active. Usually, the lifetime of a rule is determined when the rule is activated during initial system startup or during rule update. However, provision may be made for reviving selected rules, and for rules having perpetual lifetimes. Preferably, a set of basic protection rules are stored in either the ROM 34 at the time of manufacture, or together with the PrimaryOS and BackUpOS at the time they are stored into their respective NVRAMs. In general, to prevent unauthorized tampering, the FireBreak 12 should be unable to actually remove rules from the local databases or to assign a fixed lifetime to rules created with perpetual lifetimes.

Figure 3A:
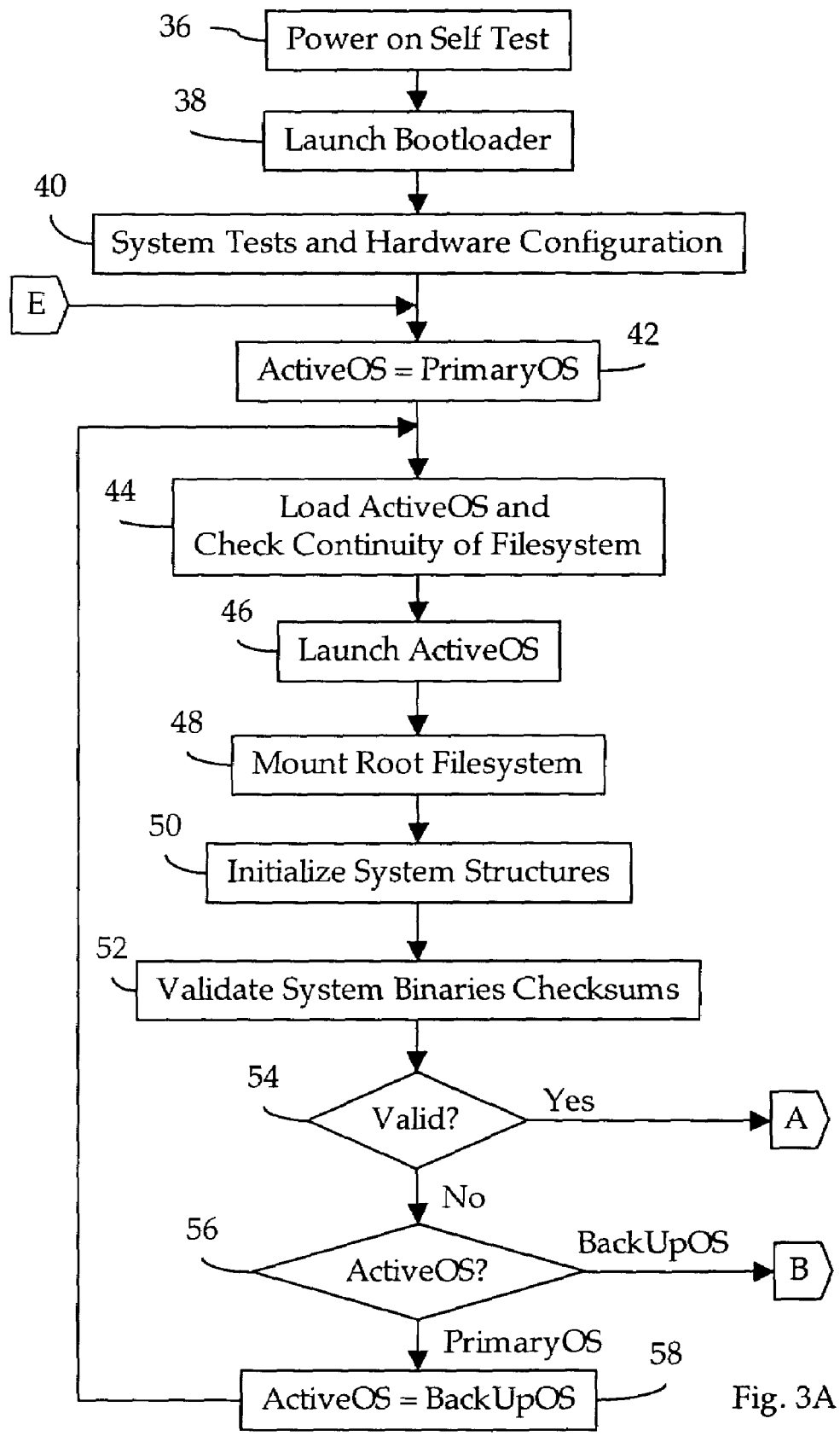
FIG. 3, comprised of FIGS. 3A-3D, illustrates in flow diagram form a method of implementing the FireBreak portion of the FireNet, according to the preferred embodiment of our invention
Figure 3B:
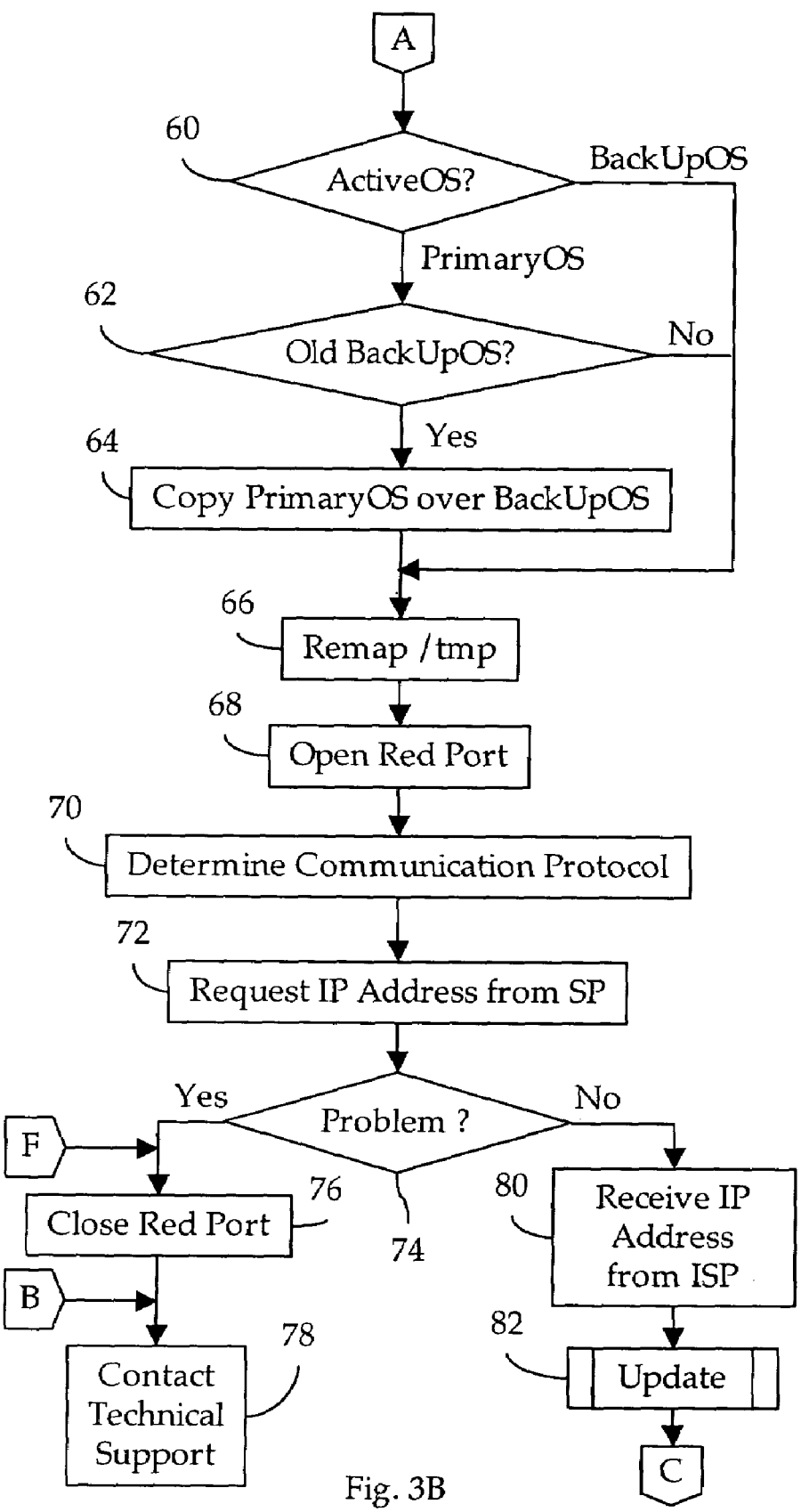
Figure 3D:
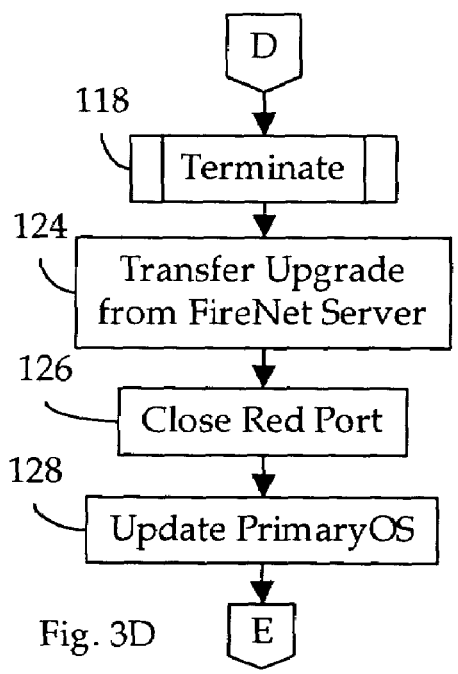

Operation of our FireBreakOS is illustrated in FIG. 3. Each time a FireBreak 12 is powered up, the various hardware components will initially perform a conventional Power on Self Test or POST (step 36), during which each component capable of doing so runs the manufacturer's built-in self-tests and hardware diagnostics. If the hardware passes POST, the bootloader, resident in the ROM 34, will be launched (step 38), and will first determine the operational status of all board level components (step 40). If there is an irreconcilable problem, an alarm will asserted, such as illuminating a light emitting diode or LED visible on the external surface of the FireBreak 12 or, perhaps, presenting a suitable error message on a liquid crystal display or LCD on the exterior surface of the FireBreak 12. If all self-tests are successful and no system hardware problems are detected, the bootloader will select the PrimaryOS as the ActiveOS (step 42).

Depending upon the selected OS, the bootloader will load the ActiveOS into the RAM 32 (step 44), and then check the continuity of the associated filesystem. If the filesystem is found to be in order, the bootloader will then launch the ActiveOS (step 46), which promptly mounts the root or "/" filesystem (step 48), but restricted to read-only. One of the major directories that is created during the mount process is a temporary or /tmp directory. According to our invention, the Verification Dictionary is initially made accessible via a respective entry in this /tmp directory.

The ActiveOS then initializes various system configuration and control structures according to available hardware resources (step 50). To facilitate future expansion, we recommend providing hardware detection stubs for each optional hardware component which might be used in a maximum configured FireBreak 12.

The ActiveOS then calculates the checksums of all of its system binaries and verifies each against the corresponding checksum stored in the Verification Dictionary, which, as was explained above, is accessible via the /tmp directory of the initial root filesystem (step 52). If any critical binary is found to be invalid (step 54), suggesting that a cracker may have managed to corrupt the selected OS, and the ActiveOS is the PrimaryOS (step 56), then the ActiveOS will select the BackUpOS as the ActiveOS (step 58), and initiate OS relaunch (see, step 44). If an invalid binary is found and the BackUpOS is already the ActiveOS, then the entire system is suspect, and the ActiveOS will proceed to shut down (see, step 78).

If the binaries of the ActiveOS are found to be valid and the ActiveOS is the PrimaryOS (step 60), the ActiveOS compares the version date of the PrimaryOS to that of the BackUpOS (decision 62), and if the BackUpOS is older, the ActiveOS copies the PrimaryOS from the Primary Memory 28 into the BackUp Memory 30 (step 64). As will be described below, the PrimaryOS may be periodically updated by the FireNet Server 4 and this procedure allows the BackUpOS to also be securely updated.

Having validated (and, perhaps, updated) the BackUpOS or, alternatively, discovered that the ActiveOS is the BackUpOS (see, step 60), the ActiveOS creates a new /tmp directory (step 66), this time in the RAM 32, and maps it over the /tmp directory that was created when the filesystem was initially mounted (see, step 48). As a result of this remapping, the Verification Dictionary containing the checksums is completely hidden before the RedPort 24 is opened.

Assume for a moment that a cracker has, at some time since the last boot load, somehow managed to hack into the FireBreak 12 and modify at least one of the system binaries of the ActiveOS. Upon comparing, during the next boot load, the calculated checksum of the hacked binary against the proper checksum stored in the Verification Dictionary, the hack will be discovered and appropriate action taken. Thus, unless the cracker is also able to hack into the Verification Dictionary and store the checksum of the hacked module in the correct location, the hack will inevitably be discovered. However, before the RedPort 24 is even opened, the link to the Verified Dictionary is overwritten, making it very difficult, if not impossible, for a cracker to find and modify.

Once /tmp has been remapped, the ActiveOS can safely open the RedPort 24 (step 68). Since at this time the type of communication protocol used on the network to which the RedPort 24 is connected is unknown, the ActiveOS must first determine the appropriate protocol to use (step 70). At the present time, the two most popular protocols are Point to Point Protocol over Ethernet or PPPoE, and Dynamic Host Configuration Protocol or DHCP. Initially, the ActiveOS attempts to connect using a default one of these protocols and if this proves unsuccessful, it attempts to use the alternate protocol. Typically, the SP will determine the protocol that is to be used for communication over their network. To reduce initial cost, it may be desirable to constrain a particular FireBreak 12 to a single protocol. Of course, other protocols, both current and future, may be used as desired.

Once the communication protocol has been negotiated, the ActiveOS requests an IPSA from the SP (step 72). If for any reason the ActiveOS is unable to obtain the necessary IPSA (step 74), it will close the RedPort 24 (step 76), and shut down after advising the client to contact technical support from the FireNet support organization (step 78). This advisory to the client may take the form of another alarm light, a series of lights, an audible alarm, or a displayed message. Since the client will not be able to contact the FireNet Server 4 electronically through the FireBreak 12 itself, they must contact the support staff using other means, such as a telephone or a Fax machine.

Figure 4:
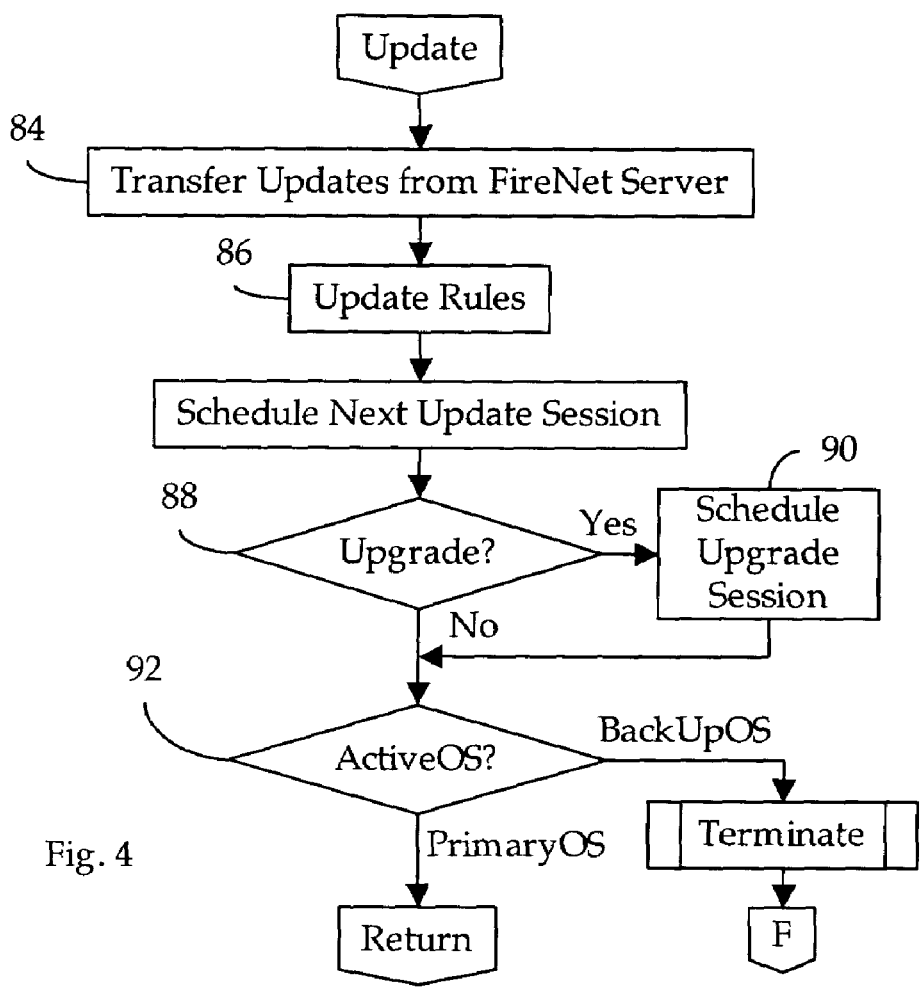
FIG. 4 illustrates in flow diagram form the update session procedure of the FireBreak OS.

Upon receiving the assigned IPSA (step 80), the ActiveOS executes an update procedure (step 82). During the update procedure, illustrated in FIG. 4, the ActiveOS will initiate an update session, during which it will transfer any protection rule updates from the FireNet Server 4 (step 84). Preferably, the actual update session is conducted using a secure protocol, such as an encryption based upon the private key that was stored in the ROM 34 at the time of manufacture. Another suitable secure protocol is set forth in the Related Application. If new rules were transferred, the ActiveOS updates the local rules database in the RAM 32 (step 86) and schedules the next update session (step 88). We recommend that the period between scheduled update sessions be on the order of between Fifteen (15) and Thirty (30) minutes.

If the ActiveOS is advised by the FireNet Server 4 (step 90) that the FireNet OS has been upgraded, then the ActiveOS will schedule an upgrade session. If the upgrade is indicated as being an emergency upgrade, then the upgrade session will be scheduled as soon as possible, taking into consideration the recent level of activity by the client; otherwise, the upgrade will be scheduled for a period when the level of activity can be expected to be low, such as late at night. If the BackUpOS should ever still be the ActiveOS following an update session (step 92), a major fault has occurred and the ActiveOS will execute the terminate procedure (step 94) and then shut down (see, step 76). If, as will usually be the case, the PrimaryOS is current and the ActiveOS is the PrimaryOS, the ActiveOS simply returns from the update procedure to the main flow.

At this point, the ActiveOS can execute the service initiation procedure (step 96). During the service initiation procedure, illustrated in FIG. 5, the ActiveOS opens the BlackPort 26 (step 98), initiates full communication services between the BlackNet and the RedNet 6 (step 100), and returns to the main flow.

At this point, the ActiveOS determines if an upgrade session is scheduled (step 102). If no upgrade session is scheduled, but an update session is scheduled (step 104), then the ActiveOS performs the update procedure (step 106; see, FIG. 4). The ActiveOS is now ready to provide normal support services to the client.

One such service consists of filtering of incoming transactions (step 108). If a transaction passes all protection rules, it is forwarded to the BlackNet (step 110); whereas if the transaction fails any of the protection rules, it is discarded (step 112). Examples of active threats include: a request from any host to connect to either the BackOrifice or NetBus ports, a connection request from any host with an ICMP "destination unreachable" response, a Port Scan from any unauthorized host, more than Fifteen (15) ICMP "echo requests" from any single host within a predetermined time window, say One (1) minute, and a SYN or ACK without CONNECT from any host. Some transactions which pass all protection rules may still appear suspicious or suggestive of a threat, in that they are of an unexpected type or are requesting an unusual type of response from the BlackNet. Examples of suggestive threats include: a request from any host to connect to ports 25, 109, 110, 137, 139, 143 or 220; and a request from any host other than a FireNetServer for connection to any port reserved for emergence FireNet communications. In addition, we reclassify as suggestive threats certain other passive threats if they are repeated within a predetermined threat interval, say Twenty (20) minutes, including a request from any host to connect to ports 80 or 443.

Upon identifying a transaction as a threat, the ActiveOS will extract from the suspicious transaction sufficient information for the FireNet Server 4 to determine, if possible, the source and nature of the transaction; if necessary, the entire transaction may be saved. The ActiveOS will then initiate an alert session to transfer the threat transaction information to the FireNet Server 4 (step 114), immediately followed by an update session (step 116; see, FIG. 4). Of course, the ActiveOS can, at the option of the client, forward the suspicious transaction to the BlackNet on the assumption that the client will deal appropriately with it. In such an event, in the background, the ActiveOS might initiate an abbreviated alarm session with the FireNet Server 4 just in case the transaction turns out to be a component of an attack.

During normal operation, the transaction filtering service will resume until, at the next scheduled upgrade time (step 102), the ActiveOS will execute the service termination procedure (step 118). During the service termination procedure, illustrated in FIG. 6, the ActiveOS will terminate all services to the client (step 120), and close the BlackPort (step 122) before returning to the main flow. At this point, the ActiveOS will download the upgrade (step 124) and close the RedPort (step 126). The ActiveOS can now safely update the PrimaryOS (step 128), and then reboot the system (see, step 82).

Figure 7:
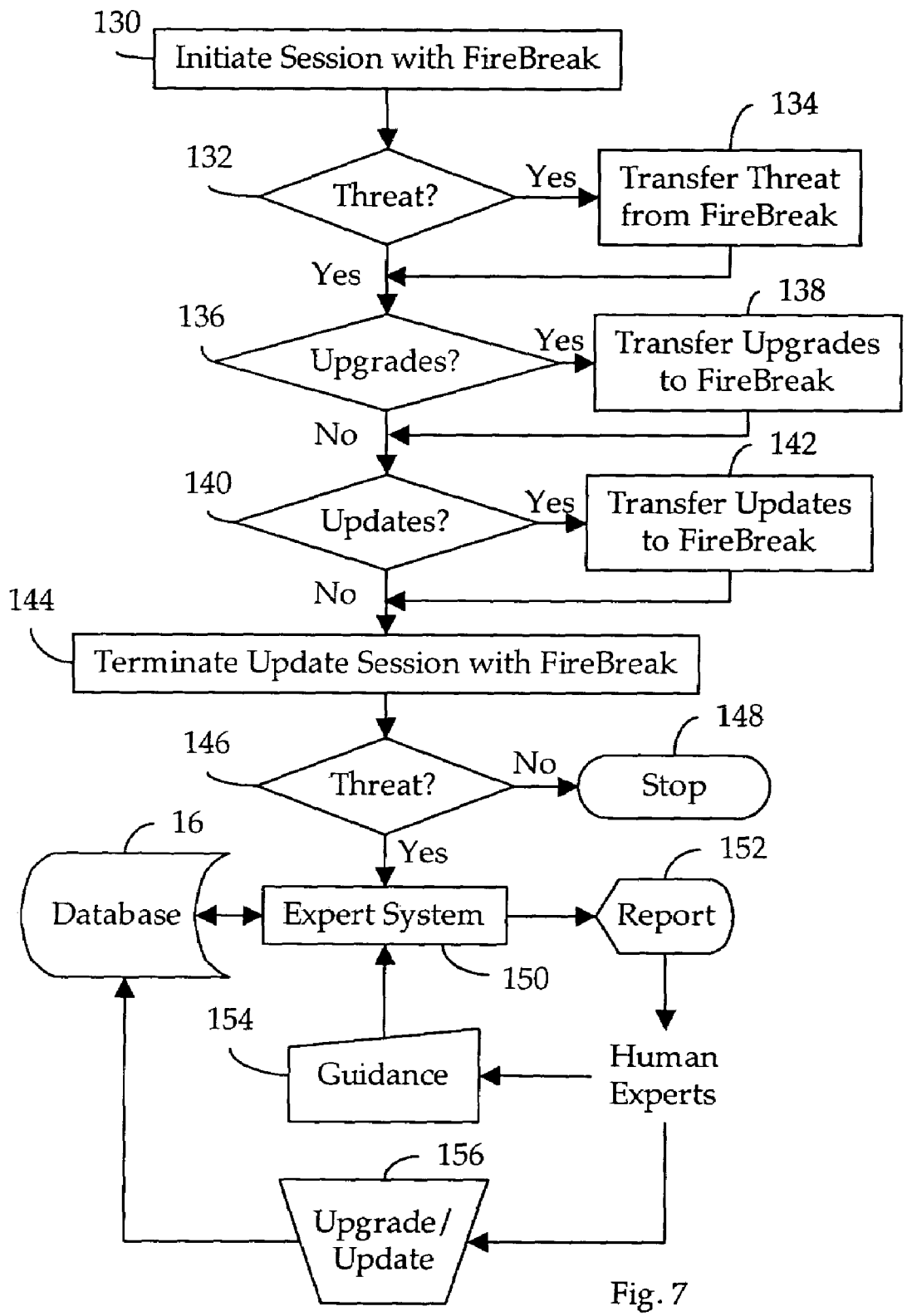
FIG. 7 illustrates in flow diagram form a method of implementing the Server portion of the FireNet, according to the preferred embodiment of our invention.

In our preferred embodiment, we harden the Linux OS with our special security modules to form a FireNetServerOS. Operation of our FireNetServerOS is shown in FIG. 7. In response to receiving a session request from any FireBreak 12, the FireNetServerOS will initiate a session (step 130). If the session was requested by FireBreak 12 to report a threat (step 132), the FireNetServerOS will upload the threat information (step 134). If the request is for an OS upgrade (step 136), the FireNetServerOS will download all such upgrades to the FireBreak 12 (step 138). Similarly, if the session was requested by FireBreak 12 as part of a normal update cycle (step 140), the FireNetServerOS will transfer all relevant updates to the FireBreak 12 (step 142). The FireNetServerOS will then terminate the update session (step 144).

If the FireBreak 12 has reported no threat (step 146), the FireNetServerOS will terminate the session and proceed to other operations (step 148). If a threat has been reported, the FireNetServerOS will invoke an Expert System (step 150) that has been trained by human experts to analyze transactions and identify, if possible, both attack sources and strategies. If the Expert System is able to identify either, it will automatically construct One (1) or more suitable protection rules, and update the database 16 appropriately. If the Expert System is unable to identify either source or strategy, either because neither are yet known to the Expert System or because the transaction is indeed legitimate, the Expert System will produce a report on a suitable medium, such as a display (step 152) or perhaps in hard copy. Upon subsequent review by human experts, the Expert System may be manually provided additional guidance (step 154) as to a more appropriate or robust analysis methodology. Of course, the human experts may also choose to manually update the database 16 so as to expedite update of the FireNet 2 while the Expert System is being given the necessary supplemental training. As necessary, the human experts may also upgrade the FireBreakOS (step 156) stored in the database 16 to provide additional services, repair bugs, improve efficiency, etc.

Although we have described our FireNet in a context wherein a single, central FireNet Server 4 is responsible for updating each FireBreak 12 in the entire FireNet 2, we expect that such an arrangement will quickly become overwhelmed by the sheer volume of update traffic. To some extent this problem can be ameliorated by increasing the time between update sessions, but in so doing the FireNet will be vulnerable to new attacks for the duration of the longer update periods. We prefer, instead, to either increase the number of Servers as the guaranteed system response time approaches a maximum, say Fifteen (15) minutes, or, alternatively, to enlist the assistance of the various SPs to whom our clients subscribe, so that the updates are forwarded, as created by the responsible FireNet Server, to each such SP. Thereafter, each FireBreak can be locally updated using the resources of it's SP. Of course, all threat reports will still need to be forwarded by the intermediary SPs to any one of perhaps several, widely distributed FireNet Servers. Such a distributed arrangement, in addition to easing the pressure on the FireNet Servers, also decreases the vulnerability of the entire FireNet to single points of failure. Many feasible variations and combinations of such arrangements can easily be envisioned, and may be suitable in specific instants according to known principles of system redundancy.

Thus it is apparent that we have provided a communication security system or FireNet in which the activities of a plurality of FireBreaks, each protecting a respective BlackNet against attack from a RedNet, are coordinated by a remote FireNet Server. Those skilled in the art will recognize that modifications and variations can be made without departing from the spirit of our invention. Therefore, we intend that our invention encompass all such variations and modifications as fall within the scope of the appended claims.

What we claim is:

1. A communications security system to prevent transfer of selected communication transactions from an untrustworthy network to a trustworthy network, comprising:

a server, connected to the untrustworthy network, configured to maintain a plurality of protection rules, each of which, when applied to a communication transaction, identifies that communication transaction to be a respective one of the selected communication transactions; and a portal, connected between the untrustworthy network and the trusted network, that is configured to:

cooperate with the server to transfer the plurality of protection rules from the server to the portal via the untrustworthy network;

receive a communication transaction from the untrustworthy network for transfer to the trustworthy network;

apply one or more of the protection rules to the received communication transaction; and selectively transfer to the server at least a portion of the received communication transaction via the untrustworthy network if a protection rule identifies the received communication transaction to be a respective one of the selected communication transactions.

2. The communications security system of claim 1 wherein the server is further configured to create a new protection rule based on the transferred portion of the communication transaction and transfer the newly created protection rule to the portal.

3. The communications security system of claim 2 wherein the server is further configured to employ an expert system to analyze the transferred portion of the communication transaction to create the new protection rule.

4. The communications security system of claim 1 wherein the protection rule is of a guard class.

5. A portal for use in a communications security system to selectively transfer a communication transaction in accordance with a protection rule maintained by a server, the portal having a computer-readable storage medium storing computer-executable instructions that, when executed, perform a method comprising:

receiving the protection rule from the server;
receiving the communication transaction;
applying the protection rule to the received communication transaction;
preventing the transfer of the received communication transaction if required by the protection rule; and
selectively transferring to the server at least a portion of the received communication transaction even if the protection rule allows transfer of the received communication transaction.

6. The portal of claim 5 wherein the method further comprises receiving from the server a newly created protection rule based on the transferred portion of the received communication transaction.

7. The portal of claim 5 wherein the portion of the received communication transaction is transferred if the protection rule is of a guard class.

8. The portal of claim 5 wherein if the protection rule is of an exclusion class, the received communication transaction is not transferred to a trustworthy network.

9. The portal of claim 8 wherein if the protection rule is of a guard class, the received communication transaction is transferred to a trustworthy network and a portion of the received communication transaction is transferred to the server.

10. The portal of claim 5 wherein the method further comprises asserting a warning signal.

11. The portal of claim 5 wherein the method further comprises re-directing the communication transaction to a specified computing device.

12. The portal of claim 5 wherein the protection rule has a specified lifetime.

13. A communications security method performed by a portal having a processor wherein the portal selectively transfers a communication transaction in accordance with a first protection rule maintained by a server, comprising:

receiving the first protection rule from the server;
receiving the communication transaction;
applying the first protection rule to the communication transaction;
preventing the transfer of the communication transaction if required by the first protection rule;
selectively transferring to the server at least a portion of the communication transaction even if the first protection rule allows transfer of the communication transaction; and
causing the server to selectively create a second protection rule in response to the portion of the communication transaction.

14. A communications security method, comprising:

transferring a first protection rule to a portal;
receiving from the portal, upon application by the portal of the first protection rule, at least a portion of a communication transaction the portal received from a device of an untrustworthy network;
determining whether a second protection rule should be created based on the received portion of a communication transaction; and
if the second protection rule should be created, creating the second protection rule; and
transferring the created second protection rule to the portal.

15. The method of claim 14 wherein the portion of the received communication transaction is received when the first protection rule is of a guard class.

16. The method of claim 14 wherein if the first protection rule is of a guard class, the communication transaction is also transferred to a trustworthy network.

17. The method of claim 14 wherein the method further comprises re-directing the received communication transaction to a specified computing device.

18. The method of claim 14 wherein the second protection rule has a specified lifetime.

19. The method of claim 18 further comprising specifying the lifetime of the second protection rule.

20. The method of claim 18 further comprising reviving the lifetime of the second protection rule.

21. The method of claim 18 wherein the lifetime does not expire.

22. The method of claim 14 wherein the determining includes employing an expert system.

23. A communications security system to prevent transfer of selected communication transactions from an untrustworthy network to a trustworthy network, comprising:

a portal, connected between the untrustworthy network and the trusted network, that is configured to:

cooperate with a server to transfer the plurality of protection rules from the server to the portal via the untrustworthy network, wherein the server is connected to the untrustworthy network and is configured to maintain a plurality of protection rules, each of which, if applied to a communication transaction, identifies that communication transaction to be a respective one of the selected communication transactions;

receive a communication transaction from the untrustworthy network for transfer to the trustworthy network;

apply one or more of the protection rules to the received communication transaction; and selectively transfer to the server at least a portion of the received communication transaction via the untrustworthy network if a protection rule identifies the received communication transaction to be a respective one of the selected communication transactions.

24. A communications security system to prevent transfer of selected communication transactions from an untrustworthy network to a trustworthy network, comprising:
a server, connected to the untrustworthy network, configured to:
maintain a plurality of protection rules, each of which, when applied to a communication transaction, identifies that communication transaction to be a respective one of the selected communication transactions; and
receive a portion of a communication transaction received by a portal and
determined by the portal to be a respective one of selected communication transactions
determine whether the communication transaction is part of an attack; and if the communication transaction is part of an attack, create a new protection rule based on the communication transaction.

25. A computer-readable storage medium storing computer-executable instructions, the instructions comprising:
receiving a protection rule from a server;
receiving a communication transaction;
applying the protection rule to the received communication transaction;
preventing transfer of the received communication transaction if required by the protection rule; and
selectively transferring to the server at least a portion of the received communication transaction even if the protection rule allows transfer of the received communication transaction.

26. A computer-readable storage medium storing computer- executable instructions, the instructions comprising:
transferring a first protection rule to a portal;
receiving from the portal, upon application by the portal of the first protection rule, at least a portion of a communication transaction the portal received from a device of an untrustworthy network
determining whether a second protection rule should be created based on the received portion of a communication transaction; and
if the second protection rule should be created, creating the second protection rule; and transferring the created second protection rule to the portal.

* * * * *